March 1, 1966     R. B. MASON ETAL     3,238,119
NITROGEN REMOVAL FROM HYDROCRACKING FEEDS
Filed Dec. 19, 1962
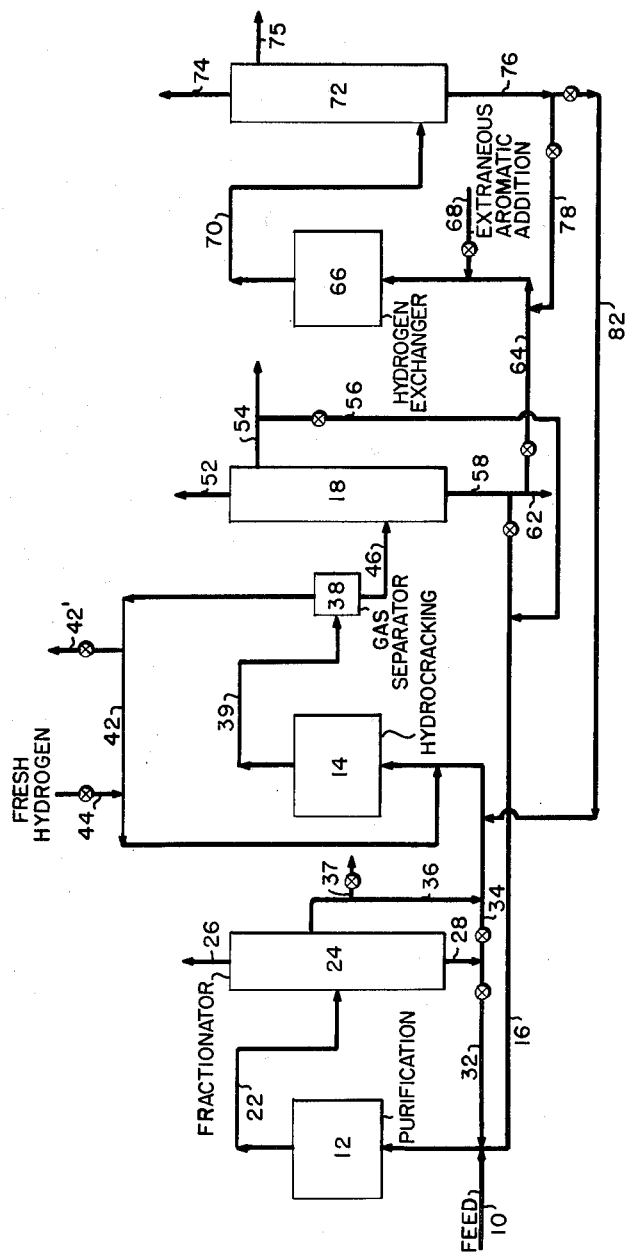
Ralph Burgess Mason
William Floyd Arey, Jr.    Inventors
By [signature]
Patent Attorney United States Patent Office 3,238,119
Patented Mar. 1, 1966

3,238,119
NITROGEN REMOVAL FROM HYDRO-
CRACKING FEEDS
Ralph Burgess Mason, Denham Springs, and William
Floyd Arey, Jr., Baton Rouge, La., assignors to Esso
Research and Engineering Company, a corporation of
Delaware
Filed Dec. 19, 1962, Ser. No. 245,853
9 Claims. (Cl. 208—89)

Recent developments in hydrocracking operations show promising possibilities for the conversion of refractory high boiling aromatic compounds such as those that occur in petroleum distillate stocks, such as gas oil, shale oils, catalytic cracking cycle stocks, thermally cracked oils and cycle oils, and the like, to good quality motor fuels such as gasoline. The refractory nature of these stocks render them unsuited to conventional catalytic cracking. If the oil feed does not contain catalyst poisons, the refractory nature of the oil feed to conventional cracking is no deterrent to the hydrocracking process.

Although catalysts comprising a noble metal such as platinum or palladium composited with a zeolitic crystalline molecular sieve are less susceptible to poisons such as nitrogen compounds in the oil feed stock boiling range than other known hydrocracking catalysts, such poisons at relatively high levels, above about 50 p.p.m. (parts per million by weight of nitrogen calculated as elemental nitrogen) either destroy the catalyst activity, reduce the catalytic performance, and/or shorten the life of the catalyst. This presents a problem in hydrocracking high nitrogen oil feeds such as coker gas oils, shale oils, catalytic or thermally cracked cycle oils, etc.

It is well known in the prior art to hydrotreat such feeds to lower nitrogen content prior to hydrocracking. Normally, catalysts such as cobalt molybdate alumina or nickel molybdate alumina are used for the nitrogen reduction by hydrotreating. However, high pressures, i.e. greater than 1000 p.s.i.g., and high hydrogen rates, i.e. about 10,000 s.c.f./b., are required to give sufficiently low nitrogen content oils for feeding to a hydrocracker. Such a pretreating step adds considerably to the cost of the operation, especially with higher nitrogen containing feeds.

The present invention discloses a process which enhances nitrogen removal while employing reduced hydrogen rate or pressure, and thus is more economical, while at the same time furnishing an oil which permits a hydrocracking catalyst such as nickel sulfide on silica-alumina, noble metals composited with a zeolitic molecular sieve and the like to perform with maximum efficiency. The invention is not limited to noble metals or molecular sieve catalysts as the invention is operable with hydrocracking catalysts generally. The process of the present invention requires no additional hydrogen compression so that the costs of the operation are minimized.

According to the present invention, oil feeds containing contaminants such as nitrogen and/or sulfur compounds are hydrocracked in a two-stage process, wherein the first stage comprises a catalytic hydrogen exchange purification step employing portions of the hydrocracked product as a hydrogen donor, and wherein the second stage comprises the step of catalytically hydrocracking the purified feed with recycle of the hydrogen donor component to the purification step. With the present process the introduction of an extraneous hydrogen donor is avoided or eliminated. Also no separate hydrogenating step is required to add hydrogen to the spent hydrogen donor.

The hydrogen donor component of the hydrocracked product is preferably the hydrocracked bottoms or the bottoms fraction separated from the hydrocracked products or hydrocracked bottoms but may be a lower boiling fraction such as a hydrocracked naphtha or a fraction thereof. The hydrogen donor component is rich in relatively high boiling naphthenes including condensed naphthenes. The hydrocracking of the feed stock is carried out at a conversion so that the hydrocracked bottoms boiling above about 380° F. will contain between about 20 and 70 wt. percent naphthenes.

More specifically, oil feed containing nitrogen and/or sulfur contaminants which is to be catalytically hydrocracked is first passed to a catalytic purification step to remove all or a substantial portion of the contaminants. The oil feed to the purification step includes the 375° F. plus hydrocracked product, a fraction or fractions thereof, a naphthene portion of the hydrocracked naphtha product, which naphtha product has a boiling range between about 90° F. and 375° F., or a combination of these streams or fractions to provide a sufficient quantity of suitable naphthenes to effect the purification. The purification step is carried out at a temperature in the range between about 500° F. and 1000° F. and at a pressure in the range between about 500 and 5000 p.s.i.g. (pounds per square inch gage). Higher pressures may be employed, if desired. The oil feed rate may be in the range between about 0.25 and 4 v./v./hr.

The purification step is carried out in the presence of a hydrogenation-dehydrogenation catalyst or other known hydrogen transfer catalysts such as activated carbon. The catalyst is preferably one insensitive to nitrogen and sulfur contaminants. Cobalt molybdate on alumina functions very well as a hydrogenation-dehydrogenation type catalyst for the purification step. Other catalytic materials which may be used in the purification step include one or more of cobalt, nickel and copper salts of the oxy and thio acids containing chromium, molybdenum or tungsten; the oxides and sulfides of nickel, copper, cobalt and iron; and the oxides or sulfides of molybdenum or tungsten. These catalytic materials may be used with or without supports, but it is preferred to support these catalytic materials or components on materials such as alumina, activated carbon, treated clays, silica, diatomaceous earths, zeolites, and the like.

The catalytic materials may be used in conventional manner either in a fixed bed type operation or in sump phase operation. With extremely high boiling oil feed components, the sump phase operation is preferred. Regardless of the phase conditions within the reaction zone, an important feature of this purification stage is that the introduction of gaseous hydrogen as such into the reaction zone is not required. However, with some feeds, the introduction of gaseous hydrogen may be helpful. However, the amount of hydrogen used is less than that required in the absence of the hydrogen donor.

The impurities from the purification step are removed as either gaseous or low boiling materials and this removal is best accomplished by fractionation with the necessary temperature and pressure reductions to obtain condensation of the high boiling components and removal of low boiling impurities. The hydrocarbon components removed with the impurities may be scrubbed out, recovered and combined with the hydrocracked product from the second step.

The purified product from the fractionation is preferably passed on to the hydrocracking step without further separation, but it is within the scope of the invention to recycle the highest boiling components back to the first or purification step.

The product substantially freed of nitrogen and/or other contaminants is passed on to the hydrocracking operation or step where, in the presence of a hydrocracking catalyst, conversion to high octane motor fuel is effected with a minimum of hydrocracking catalyst degradation.

The hydrocracking catalyst may be one selected from oxides and sulfides of chromium, molybdenum, tungsten, iron, cobalt, nickel, or the noble metals such as platinum or palladium supported on or composited with a carrier such as silica-alumina, zeolites, silica-magnesia, alumina, clays, etc.

For example, a hydrocracking catalyst containing about 8 wt. percent of nickel sulfide on silica-alumina may be used. This catalyst was prepared by impregnation of silica-alumina cracking catalyst with nickel nitrate so that after subsequent decomposition and reduction the composition contained 6% nickel. Thereupon, the catalyst was sulfided and after use the nickel corresponded to the $Ni_3S_2$ structure.

Another suitable catalyst is prepared upon impregnating an activated carbon with an ammoniacal solution of ammonium molybdate so that after decomposition and sulfiding the molybdenum sulfide content is 10%. Another catalyst eminently suited for this hydrocracking working is prepared by activating a Super filtrol with aqueous hydrogen fluoride and calcining. The activated base is impregnated with an ammoniacal solution of ammonium tungstate so that after decomposition and sulfiding the tungsten sulfide contents is 9%.

The foregoing are examples of supported sufide catalysts. Non-supported catalysts are also active for hydrocracking. One such non-supported catalyst is prepared from precipitation of a mixed nickel tungsten solution, containing nickel and tungsten in the mole ratio of 2/1, with hydrogen sulfide. The co-precipitated sulfides are filtered, washed, dried and pilled.

The platinum group metals such as platinum and/or palladium are used with supports because the cost of these noble metals renders high concentrations uneconomical. With supports other than the zeolites, these catalysts are prepared by impregnation of the support, such as silica-alumina, with acidified chloride solutions and subsequent decomposition. With the zeolite supports the noble metal is deposited by an ion exchange mechanism preferably using the hydrogen form of the zeolite with either the chloride of platinum or palladium.

Other platinum group metals such as rhodium, iridium, ruthenium or the like may be used instead of platinum or palladium. The zeolitic molecular sieve is one preferably having uniform pore openings between about 6 and 20 Angstrom units and having no more than 10% sodium calculated as $Na_2O$.

In the hydrocracking zone or step, the conditions are usually maintained in the following ranges:

| | |
|---|---|
| Feed Rate, v./v./hr. | 0.2 to 4 |
| Hydrogen Rate, c.f./barrel of feed | 200–10,000 |
| Pressure, p.s.i.g. | 300–2000 |
| Temperature, ° F. | 400–800 |

In a modification of the process, the aromatic yield in the naphtha fraction is increased in hydrocracking operations by hydrogen exchange with the hydrocracked bottoms to produce an appreciable yield of $C_6$–$C_{13}$ aromatic hydrocarbons. The bottoms fraction also is made more aromatic which produces a better feed for recycle to the hydrocracking zone.

The drawing diagrammatically shows one way of carrying out the present invention.

Referring now to the drawing, the reference character 10 designates a line for introducing a hydrocarbon oil feed into purification zone 12 containing a catalyst which is a hydrogenation-dehydrogenation catalyst. The feed is any suitable feed to be catalytically hydrocracked after being treated in purification zone 12 and may be shale oil, catalytic or thermally cracked cycle stocks, coker or virgin gas oil, kerosene or other similar hydrocarbon oils. The oil feed may also be crude petroleum oil or a residual petroleum oil but in this case the oils should be of relatively low ash content (i.e. less than about 150 p.p.m.) or be subjected to a pretreatment to lower their ash content to such a level. The distillate oil feed usually has a boiling point range between about 430° F. and 1050° F. and contains about 10 to 50 vol. percent of naphthenes, about 15 to 55 vol. percent of paraffins and about 10 to 85 vol. percent of aromatics.

The catalyst in purification zone 12 is cobalt molybdate on alumina or any other suitable catalyst above referred to. The feed oil contains nitrogen compounds which are contaminants for the hydrocracking catalyst in the hydrocracking zone 14 later to be described in greater detail. The nitrogen content of the oil feed is reduced in passing through the purification zone 12. The zone 12 is maintained at an elevated temperature between about 500 and 1000° F. and a pressure between about 500 and 2500 p.s.i.g. The space velocity is between about 0.25 and 4 v./v./hr. Also introduced into the purification zone 12 is a recycle stream from line 16 which comprises hydrocracked bottoms separated from the hydrocracked products fractionated in fractionator 18. The hydrocracked bottoms are withdrawn from the bottom of fractionator 18 through line 16 for recycle to zone 12. Instead of the hydrocracked bottoms, a poriton of the naphtha from hydrocracking may be recycled to zone 12 as a hydrogen donor.

The hydrocracked bottoms functions as a hydrogen donor and diluent or solvent and contain naphthenes such as condensed ring naphthenes. The hydrocracked bottoms obtained by hydrocracking a light catalytically cracked cycle oil boiling in the range between about 430° F. and 650° F. at a selected conversion to produce a hydrocracked product including gases, naphtha and bottoms and so that the separated hydrocracked bottoms boiling above about 380° F. and preferably above 430° F., will contain between about 20% and 70% by weight of naphthenes.

The oil feed and the hydrocracked bottoms undergo hydrogen exchange in zone 12 to remove all or a major portion of the nitrogen-containing compounds from the oil feed. Some cracking occurs to produce lower boiling gas oils, naphthas, and gaseous products. Also hydrogen exchange takes place between the naphthenes of the donor and the extremely high boiling aromatics of the feed. Zone 12 effluent having such characteristics is passed through line 22 to first fractionator 24 to separate low boiling hydrocarbon components and gases containing impurities comprising nitrogen and sulfur compounds which go overhead through line 26 from fractionator 24. The nitrogen is removed as ammonia and low boiling amines. The low boiling components may be treated with a scrubbing or absorber liquid such as water, caustic, ethanol amine, etc., to separate impurities such as ammonia and hydrogen sulfide from hydrocarbon gases and to recover the hydrocarbons to be added to the hydrocracked naphtha from the second stage to be described later in greater detail.

In fractionator 24 the purified hydrocarbons are separated into a naphtha boiling below about 400° F., a gas oil fraction boiling in the range between about 400° F. up to 650 to 1050° F., and a bottoms fraction boiling above about 650 to 1050° F. The bottoms fraction is withdrawn from the bottom of the fractionator 24 through line 28 and a portion may be recycled to the purification zone 12 through line 32. Another portion of the bottoms may pass through line 34 to the hydrocracking zone 14. The distillate comprising either heavy naphtha (380–430° F.) or a 430° F.+ gas oil or mixture thereof is withdrawn from fractionator 24 as a side stream through line 36 and passed to hydrocracking zone 14 through line 34 along with the portion of the bottoms stream therein. Or a portion of the distillate may be withdrawn from the process through line 37 without further processing for use as jet fuel, kerosene, etc.

The purified oil feed is hydrocracked in the hydrocracking zone 14 under hydrocracking conditions in the presence of introduced hydrogen and a hydrocracking catalyst to produce gasoline and higher boiling and lower boiling hydrocarbons. The temperature in hydrocracking zone 14 is between about 500 and 800° F., the pressure is between about 500 and 2000 p.s.i.g., and the flow rate of feed is between about 0.25 and 10 v./v./hr. The hydrocracked products are withdrawn from zone 14 through line 39 and cooled and passed to gas separator 38 for separating hydrogen-containing gas from liquid hydrocarbons. The gas is preferably treated in a conventional manner to concentrate and/or purify the gas and the gas is then recycled through line 42 to hydrocracking zone 14. Some of the gas may be bled from the system through line 42′ as needed. Fresh make-up hydrogen is added to line 42 as needed through line 44.

The separated liquid hydrocarbons are withdrawn from the gas separator 38 through line 46 and introduced into the second fractionator 18 for separating gases and low boiling hydrocarbons from higher boiling hydrocarbons. The light hydrocarbons and gases pass overhead through line 52 and may be further treated as desired to recover low boiling hydrocarbons. A hydrocracked naphtha having a boiling point range between about 50° F. and 430° F. and a yield in the range between about 20 and 75 vol. percent on the oil fed to the hydrocracking zone 14 is withdrawn as product through line 54 as a sidestream from the fractionator 18.

A portion of the hydrocracked naphtha may be withdrawn from line 54 through line 56 and recycled to the purification zone 12 through line 16. The hydrocracked naphtha contains naphthenes which function as hydrogen donors and the hydrocracked naphtha may be used along with the hydrocracked bottoms in the purification zone 12. The hydrocracked bottoms boiling above about 380° F. and preferably above about 430° F. are withdrawn from the bottom of fractionator 18 through line 58 and the major portion thereof is recycled through line 16 to the purification zone 12 to function ah a hydrogen donor and diluent and solvent in zone 12. As above pointed out, the hydrocracked bottoms contain condensed naphthenes which are used in this invention to purify the oil feed going to the hydrocracking zone 14 by treating the feed in purification zone 12 with the hydrocracked bottoms in the presence of the catalyst such as cobalt molybdate on alumina. The weight ratio of hydrocracked bottoms to oil feed is in the range between about 1/5 and 5/1. A portion of the hydrocracked bottoms may be withdrawn through line 62 and discarded from the process.

In a modification of the invention to maximize the production of aromatic naphthas at least a portion or all of the hydrocracked bottoms withdrawn through line 58 are passed through line 64 to a hydrogen exchange zone 66 in the presence of an aromatic solvent boiling in the range between about 400° F. and 900° F. and containing condensed aromatic rings and which is introduced into line 64 through line 68. In some cases the feed to the hydrocracker may be used as the aromatic solvent for the hydrogen exchange step in zone 66.

The hydrogen exchange step removes paraffins and naphthenes from the hydrocracked bottoms and converts naphthenes in part to aromatic hydrocarbons in the naphtha boiling range. The hydrogen exchange zone 66 contains a hydrogenation catalyst such as cobalt molybdate on a suitable support such as alumina, silica-alumina, etc., platinum or palladium on molecular sieves or zeolites and the like. The temperature in zone 66 is usually maintained in the range between about 750° F. and 900° F. at a pressure in the range between about 500 and 3000 p.s.i.g. The aromatic solvent introduced through line 68 is added in an amount between about 20 and 50% of the total feed to the exchange zone 66.

The products from the hydrogen exchange zone 66 are passed through line 70 to third fractionator 72 to separate gases and low boiling hydrocarbons which pass overhead through line 74 and which are treated as desired to recover low boiling hydrocarbons. A naphtha fraction is withdrawn as a side stream through line 75 from fractionator 72. Unconverted high boiling aromatic hydrocarbons are withdrawn as bottoms from the fractionator 72 through line 76 and the bottoms may be either recycled to the hydrogen exchange zone through line 78 to be recycled to extinction or passed through line 82 for introduction into hydrocracking zone 14.

As a result of the hydrogen exchange step in zone 66, the gas oil fraction in the hydrocracked bottoms in line 58 has a decreased paraffinic content and is therefore an improved hydrocracking feed in that it gives a greater production of branched chain paraffins and alkyl benzenes in the hydrocracked naphtha. There is an appreciable yield of $C_6$–$C_{13}$ aromatic hydrocarbons in the naphtha withdrawn through line 75.

The primary function of the solvent added through line 68 is to maintain a liquid phase condition so as to minimize coke deposition and to prolong the life of the catalyst. The catalytic cycle oil feed to the hydrocracker is ordinarily not sufficient aromatic to be a preferred solvent. However an aromatic extract obtained by solvent extraction of catalytic cycle oil would be sufficiently aromatic. The hydrogen exchange step in zone 66, however, removes non-aromatic hydrocarbons so that the hydrogen exchange recycle in lines 76 and 78 from an operation with catalytic cycle oil feed via line 68 is a satisfactory solvent.

In this modification of the invention the exchangeable hydrogen is from the hydrocracked bottoms from line 64 only and in some operations this is insufficient to supply hydrogen for conversion of all the high boiling aromatic hydrocarbons in the product to naphtha. The surplus high boiling aromatic hydrocarbons are fed back to the hydrocracking zone 14 through line 82. The net effect of this operation is to provide increased aromatic content of naphtha products and improved cracking properties of the residual hydrocracked bottoms not converted in the hydrogen exchange zone 66.

As mentioned before, it is not necessary to introduce extraneous gaseous hydrogen into the hydrogen exchange zone 66 or purification zone 12. However, in some cases, particularly with heavy feeds, such introduction of a limited amount of gaseous hydrogen may be beneficial. The following examples are for operation without hydrogen flow and show the operability under such conditions.

*Example I*

Data will first be given on the purification step in zone 12 to show the excellent removal of nitrogen from the hydrocracker feed. Light catalytic cycle oil having a boiling range between about 430° F. and 650° F. and obtained as a fraction from the fluid catalytic cracking of a virgin gas oil at a temperature of about 895° F. at a conversion of about 65% was used as the feed to the purification zone 12. The cycle oil contained about 50% by weight of aromatic hydrocarbons, about 20 wt. percent of naphthenes, and about 30 wt. percent of paraffins. The hydrocracked bottoms from fractionator 18 are used as the hydrogen donor in the purification zone 12. The catalytic cycle oil has a nitrogen content of about 50 p.p.m. which is undesirably high for use as a hydrocracking feed.

The hydrocracked bottoms were separated from products from a hydrocracking operation using the same type catalytic cycle oil feed and hydrocracking at a temperature of about 670° F., a pressure of about 1500 p.s.i.g., hydrogen addition to the hydrocracking zone of about 8000 s.c.f./b. of feed and a conversion of about 50%.

The fixed bed catalyst used in the hydrocracking step was one containing 0.5% palladium on the hydrogen form of 13Y zeolite. The hydrocracked products were separated into a $C_4$ fraction, $C_5$–430° F. naphtha and 430° F.+ gas oil. Based on 100 volumes of feed, 8 volumes of $C_4$, 50 volumes of $C_5$–430° F. naphtha and 50 volumes of 430° F.+ gas oil are produced. The hydrocracked bottoms had a boiling range between about 430° F. and 650° F. and contained about 15% aromatics, 35% naphthenes and 50% paraffins.

About equal amounts of the catalytic cycle oil feed above described and the hydrocracked bottoms above described were mixed and passed over a presulfided cobalt molybdate on alumina catalyst containing about 3.5% cobalt oxide and 15% molybdenum oxide on the alumina.

The cobalt molybdate catalyst was sulfided in situ in a 60 cc. bed with carbon disulfide in an aromatic solvent using 5% carbon disulfide in an aromatic solvent containing condensed aromatic rings and boiling between about 400 and 900° F. The carbon disulfide was passed over the catalyst at a rate of 1 v./v./hr. and a temperature of 700° F. for a period of 16 hours. Following this the feeding of the sulfur containing solution was stopped and the extraneous solvent was removed by hydrogen stripping at 700° F. and the sulfided catalyst was put under a hydrogen pressure of about 1500 p.s.i.g. Then a blend containing about 50 parts by weight of the light catalytic cycle oil above described and about 50 parts by weight of hydrocracked bottoms above described was passed over the sulfided catalyst at about 750° F. and 0.5 v./v./hr.

The product was distilled and inspections showed that the 430° F. plus product was purified to a remarkable degree at the relatively low temperature of about 750° F. Data on the feed and 430° F. plus product at the catalyst age of 24 hours are:

|  | LCCO Feed | Product |
|---|---|---|
| Conversion of 430° F. plus feed to 430° F., product | 0 | 10 |
| Inspections, 430° F. plus product: |  |  |
| Nitrogen, p.p.m. | 50 | 8 |
| Sulfur, Wt. percent | 0.3 | 0.06 |

*Example II*

This example was a duplicate of Example I but a fresh charge of catalyst was used. After 42 hours at 0.5 v./v./hr. and a temperature of about 750° F., the conversion of 430° F. plus feed was 11% and the 430° F. plus product had 7 p.p.m. of nitrogen and 0.1 wt. percent sulfur. From this it is seen that purification of this feed can be achieved at a temperature where cracking is not excessive and for appreciable periods of time without catalyst regeneration.

*Example III*

In this example freshly sulfided cobalt molybdate catalyst was used as in Example II at 750° F. but after an initial period of 18 hours, the temperature was raised to about 850° F. and the operation was continued for a total of about 88 hours without catalyst regeneration. The removal of nitrogen and sulfur was excellent as the following data show:

Feed: 50/50 wt. ratio light catalytic cycle oil-hydrocracked bottoms,
Catalyst: Sulfided cobalt molybdate-alumina
Pressure: 1500 p.s.i.g., no hydrogen flow

|  | (LCCO Feed) | Temperature, ° F. | |
|---|---|---|---|
|  |  | 750 | 850 |
| Catalyst age, Hr. |  | 18 | 88 |
| Conversion, Wt. percent of 430° F. plus, Feed |  | 15 | 44 |
| Inspections, 430° F. plus, Feed: |  |  |  |
| Nitrogen, p.p.m. | 50 | 3 | 13 |
| Sulfur, Wt. percent | 0.3 | 0.02 | 0.02 |

From the above it is seen that the operation can be carried out on this feed stock for periods of 80 to 100 hours without regeneration of the catalyst.

*Example IV*

In another example the cobalt molybdate alumina catalyst was reduced with hydrogen in situ at 850° F. and atmospheric pressure for a total of 20 hours and the 200 cc. unit was pressurized with hydrogen at 1000 p.s.i.g. The feed was passed over the catalyst at 850° F. and at 0.5 v./v./hr. employing no hydrogen flow. These data were obtained under 1000 p.s.i.g. Fresh catalyst was used with each feed employed. The product was condensed and the liquid fractionated. The results are as follows:

|  | Untreated Feed | Hydrogen Donor | |
|---|---|---|---|
|  |  | None | Hydrocracked Bottoms |
| Wt. Percent Donor |  |  | 50 |
| Wt. Percent Conversion, 430° F. plus |  | 38 | 45 |
| Nitrogen in 430° F. plus, Feed or Product, p.p.m. | 50 | 17 | 0 |

In this example under the high temperature of 850° F. considerable nitrogen removal is effected without the added hydrogen donor which indicates that the donor quantities may be kept low. However, it is to be noted that the nitrogen content was reduced to zero which shows outstanding removal when using the hydrocracked bottoms as the hydrogen donor.

*Example V*

In this example the cobalt molybdate catalyst was treated with hydrogen as in Example IV and the 200 cc. reactor pressurized with hydrogen at 1000 p.s.i.g. Then a blend containing 50 wt. percent of coker gas oil obtained as a fraction from the coker products of a fluid coking unit operating at about 1000° F. and having a boiling point range of about 430° F. to 850° F. and about 50 wt. percent of hydrocracked bottoms obtained as above described was passed over the catalyst at 0.5 v./v./hr. at a temperature of about 850° F.

It is well known that coker gas oil is a very refractory feed and does not respond readily to purification and removal of nitrogen. In the present example with no use of extraneous hydrogen considerable removal of nitrogen was accomplished as shown by the inspections on the 430° F. plus product. The comparison of the data on the feed and the 430° F.+ material is as follows:

|  | Feed | Product |
|---|---|---|
| Inspections, 430° F. plus: |  |  |
| Nitrogen, p.p.m. | 2,100 | 547 |
| Sulfur, Wt. Percent | 1.1 |  |

While the nitrogen is still relatively high in the treated coker gas oil, it will be apparent that the removal of nitrogen is considerable.

*Example VI*

In this example the cobalt molybdate alumina catalyst was sulfided with carbon disulfide in an aromatic solvent of the same kind and in a manner similar to that employed in Example I and the sulfide catalyst, freed of solvent, was contacted with a 50/50 blend of light catalytic cycle stock and hydrocracked bottoms. These hydrocracked bottoms were from the hydrocracking of the same cycle oil feed (after lowering the nitrogen content to 2 p.p.m. by hydrotreating) with the 8% nickel sulfide-alumina given previously as an example of a hydrocracking catalyst. The feed blend was contacted with the sulfided cobalt molybdate in a 200 cc. flow unit at 0.5 v./v./hr. and 750° F. and 780 p.s.i.g. using no extraneous hydrogen. The 430° F.+ product from a six hour operation was 88.7 wt. percent of the feed and contained only 1 p.p.m. nitrogen as compared to 50 p.p.m. nitrogen in the raw light catalytic cycle oil feed.

*Example VII*

Experimentation in this example is similar to that in Example VI using the same feed blend and the same catalyst but at a higher temperature of 850° F. Pressure was at 750 p.s.i.g. and again no hydrogen flow was employed. The operation was for a six hour period and again substantially all of the nitrogen was removed. Comparison of the performance at 750° F. and 850° F. is as follows:

|  | LCCO Feed | Temperature, °F. | |
|---|---|---|---|
|  |  | 750 | 850 |
|  |  | Pressure, p.s.i.g. | |
|  |  | 780 | 750 |
| Liquid Product Distribution, Wt. Percent: |  |  |  |
| IBP—430° F. Naphtha |  | 11.3 | 36.3 |
| 430° F.+ Bottoms |  | 88.7 | 63.7 |
| Nitrogen Content 430° F.+ Bottoms | 50 | 1 | 2 |

*Example VIII*

This example differs from the preceding ones in that a refinery gas oil feed having 100 p.p.m. nitrogen content was used. This material was blended in 50/50 ratio by weight with hydrocracked bottoms from hydrocracking of the same feed. This blend was contacted with cobalt molybdate sulfided as in Example VI at 750° F. and 760 p.s.i.g. at a feed rate of 0.5 v./v./hr. employing no extraneous hydrogen. Also the operation was continued at 850° F. An excellent degree of nitrogen and sulfur removal resulted as the following data show:

|  | Refinery Gas Oil Feed | Temperature, °F. | |
|---|---|---|---|
|  |  | 750 | 850 |
|  |  | Pressure, p.s.i.g | |
|  |  | 760 | 750 |
| Liquid Prod. Dist. Wt. percent: |  |  |  |
| IBP—430° F. |  |  |  |
| 430° F.+ |  |  |  |
| Inspections 430° F. Btms.: |  |  |  |
| Nitrogen, p.p.m. | 100 | 5 | 5 |
| Sulfur, wt. percent | 0.08 | 0.0 | 0.002 |

*Example IX*

When the purified cycle oil from Example I containing about 8 p.p.m. nitrogen is passed through a hydrocracking unit like unit 14, it is much more readily converted than is the 50 p.p.m. nitrogen containing feed. This is illustrated by the following comparison:

| Feed Purified | No | Yes | No | Yes |
|---|---|---|---|---|
| Feed N Content | 50 | 8 | 50 | 8 |
| Hydrocracking conditions: |  |  |  |  |
| Catalyst | 0.5% Pd on 13Y Zeolite | | Nickel Sulfide on SiO₂/Al₂O₃ | |
| Temperature, °F. | 670 | 670 | 675 | 600 |
| Pressure, p.s.i.g. | 1,500 | 1,500 | 1,500 | 1,500 |
| Hydrogen, s.c.f./b. | 8,000 | 8,000 | 8,000 | 8,000 |
| Feed rate, v./v./hr. | 2 | 2 | 0.5 | 1.0 |
| Conversion to 430° F.−, Vol. percent | 20 | 90 | 40 | 50 |

*Example X*

This example relates to the modification described in connection with the third fractionator 72 where hydrocracked bottoms from line 64 are passed with an aromatic solvent to a hydrogen exchange zone 66. Aromaticity in the naphtha fraction and gas oil fraction can be increased by hydrogen exchanging a blend of light catalytic cycle oil and hydrocracked bottoms. A 50–50 weight mixture was used. The blended mixture had the following approximate composition by volume:

Aromatics _____ 25
Naphthenes (Hydroaromatics, etc.) _____ 40
Paraffins _____ 35

The feed was passed over a reduced cobalt molybdate catalyst at about 0.5 v./v./hr. at a temperature of about 850° F. and 1000 p.s.i.g. with no extraneous hydrogen flow.

The product was fractionated into three fractions as follows:

Initial boiling point–300° F.
300° F.–430° F.
430° F.–Bottoms

The first two fractions were examined by mass spectrographic analyses and the composition of the 430° F.− fraction was computed from these results. The changes in the bottoms fraction were indicated by the API gravity. These results are summarized as follows:

|  | Feed | Product | Conversion, Wt. percent |
|---|---|---|---|
| 430° F.− Fraction: |  |  |  |
| $C_6$-$C_{13}$ Aromatics, Wt. percent | 1.1 | 11.6 | 10.8 |
| Cond. Aromatics, Wt. percent | 1.0 | 3.2 | 2.3 |
| Naphthenes, Wt. percent | 0.9 | 5.3 | 4.6 |
| Paraffins, Wt. percent | 0.9 | 26.4 | 26.8 |
| Cond. Naphthene, Wt. percent | 0.2 | 1.1 | 0.9 |
| 430° F.+ Fraction: |  |  |  |
| Wt. percent | 95.9 | 52.4 |  |
| Gravity, °API | 29.0 | 22.7 |  |

The lower API gravity of the 430° F.+ product as compared to the feed shows considerable increase in aromaticity. Thus, on the basis of present knowledge, it is a better hydrocracking stock than the feed. Furthermore, it is observed that the 11.6% aromatic yield observed in the product would have been almost completely lost had the conventional catalytic hydrocracking with bottoms recycle been employed.

*Example XI*

In another example a methyl naphthalene feed which contained 0.25 wt. percent nitrogen was blended with methyl cyclohexane in a 3 to 2 mol ratio, respectively. The blend was passed over a cobalt molybdate on alumina catalyst, reduced with hydrogen before use as above described in certain of the examples, at 830° F. and 1000 p.s.i.g. at a rate of 1 v./v./hr.

The product was fractionated into fractions boiling lower than methyl naphthalene and to a bottoms fraction corresponding to methyl naphthalene. This bottoms fraction contained only 0.015 nitrogen as compared to 0.25% nitrogen in the feed. About 94% of the nitrogen was removed by using the hydrogen donor in the presence of a catalyst but in the absence of hydrogen added extraneously.

In a specific example about 10,000 b./day of catalytic cycle oil obtained as a fraction from catalytically cracked gas oil are passed through line 10 under a pressure of about 750 p.s.i.g. and a temperature of about 750° F. into purification zone 12 containing cobalt molybdate on alumina catalyst. The cycle oil has a boiling range of about 430° F. to 650° F. and contains 50 p.p.m. of nitrogen.

About 10,500 b./day of hydrocracked bottoms from line 16 are blended with the oil feed in line 10. The blended feed is passed through purification zone 12 at a space velocity of about 0.5 v./v./hr. The hydrocracked bottoms have a boiling point range of about 430° F. to 650° F. and have approximately the following composition by volume:

Aromatics _____ 15
Naphthenes _____ 45
Paraffins _____ 40

During passage through purification zone 12 there is some cracking or conversion of the 430° F. plus material to 430° F. minus material. The products from purification zone 12 are cooled and passed to fractionator 24 to separate low boiling components containing the nitrogen removed in purification zone 12. The nitrogen leaves as ammonia and low boiling amines. The fractionation is carried out under a lower pressure of about 100 p.s.i.g. The bottoms comprise a purified gas oil product having a boiling range of about 430° F. to 650° F. containing about 5 p.p.m. nitrogen.

About 2200 b./day of low boiling components pass overhead through line 26.

About 18,500 b./day of purified gas oil products are withdrawn through line 28 and passed to hydrocracking zone 14.

Provision is made for using part of the naphtha from line 36 as feed to the hydrocracking zone 14 and for recycling some of the bottoms from fractionator 24 through line 32 to purification zone 12, if desired.

The purified gas oil product in line 34 is admixed with about 8000 S.C.F. per barrel of hydrogen from line 42 and the mixture passed into hydrocracking zone 14 at a temperature of about 650° F. and a pressure of about 1500 p.s.i.g. and a space velocity of about 2 v./v./hr. The zone 14 contains 0.5% palladium on hydrogen form zeolite Y catalyst for hydrocracking.

The hydrocracked products are removed from zone 14 through line 39, cooled and passed to gas separator 38 to separate hydrogen-containing gases from liquid hydrocarbons.

About 19,700 b./day of the liquid hydrocracked products are passed through line 46 to fractionator 18 to separate about 1100 b./day low boiling components overhead through line 52. About 8100 b./day of naphtha are withdrawn through line 54. The naphtha has a boiling range of about 90° F. to 430° F., and an octane number of about 95 research + 3 cc. TEL.

About 10,500 b./day of hydrocracked bottoms having a boiling point of about 430 to 650° F. are withdrawn through line 58 and used to blend with cycle oil feed in line 10 as hereinbefore described. This operation corresponds to about 43% conversion of the charge to the hydrocracker 14. This conversion value can be altered by change of conditions but such will alter the amount of bottoms available for recycle.

In the integrated process of the present invention, the feed stock before being hydrocracked is treated in a first purification zone with hydrocracked bottoms formed in the process as a hydrogen donor without the need of adding hydrogen to remove nitrogen and/or sulfur from the gas oil feed such as light catalytic cycle oil. The purified oil feed having a substantially reduced nitrogen content is an excellent feed for the second step or stage in the process of hydrocracking to produce high octane gasoline in large yield. With the clean cycle oil feed, the hydrocracking catalyst is not poisoned, lower temperatures can be used and increased yields of naphtha with reduced losses to $C_4$ and lighter hydrocarbons are obtained. Alternates to operation at lower temperatures are (1) increased throughput and (2) reduction in pressure in the hydrocracking zone. Either of these provide sufficient economic incentive to conduct the process as outlined.

What is claimed is:

1. A process for preparing a hydrocarbon fraction boiling above about 380° F. for a catalytic hydrocracking step by removing at least part of the nitrogen contaminant from the fraction which comprises mixing a hydrogen donor diluent comprising a fraction separated from a hydrocracked oil product with said hydrocarbon fraction, passing the mixture in contact with a catalyst under superatmospheric pressure and at an elevated temperature to gasify at least part of the nitrogen contaminant, treating the mixture after contact with said catalyst to separate a volatile nitrogen-containing compound from the higher boiling hydrocarbon fraction having a reduced nitrogen content.

2. A process according to claim 1 wherein said hydrocarbon fraction contains more than 10 p.p.m. of nitrogen, the hydrogen donor diluent comprises a hydrocracked bottoms and the catalyst is a hydrogenation-dehydrogenation catalyst and the contacting is done at a temperature between about 500° F. and 1000° F. at a superatmospheric pressure above about 500 p.s.i.g. and the treated hydrocarbon fraction contains less than about 10 p.p.m. of nitrogen.

3. A process according to claim 1 wherein said hydrocarbon fraction contains more than 10 p.p.m. of nitrogen, the hydrogen donor diluent comprises a hydrocracked naphtha boiling below about 430° F. and the catalyst is a hydrogenation-dehydrogenation catalyst and the contacting is done at a temperature between about 500° F. and 1000° F. at a superatmospheric pressure above about 500 p.s.i.g. and the treated hydrocarbon fraction containing less than about 10 p.p.m. of nitrogen is hydrocracked at a temperature between about 500° F. and 800° F. at a superatmospheric pressure above about 500 p.s.i.g. and in the presence of a hydrocracking catalyst to produce high octane gasoline.

4. In the preparation of a relatively high boiling hydrocarbon feed stock containing a catalyst contaminant containing nitrogen for a catalytic hydrocracking step, the improvement which comprises mixing the contaminated feed stock with hydrocracked bottoms boiling above about 380° F. and separated from hydrocracked products and in a weight ratio of hydrocracked bottoms to oil feed between about 1/5 and 5/1, passing the mixture in contact with a hydrogenation-dehydrogenation catalyst in the absence of hydrogen extraneously added to said contacting step and under superatmospheric pressure above about 500 p.s.i.g. and at an elevated temperature between about 500° F. and 1000° F. and separating from the so-treated hydrocarbon feed a hydrocarbon feed having a reduced amount of nitrogen-containing contaminant before passing the feed to a hydrocracking zone.

5. A process according to claim 4 wherein the high boiling hydrocarbon feed stock contains more than 10 p.p.m. of nitrogen and the treatment with the catalyst and hydrocracked bottoms reduces the nitrogen to less than 10 parts per million.

6. In a process for hydrocracking oils wherein light catalytic cycle oil containing more than 10 p.p.m. nitrogen is to be catalytically hydrocracked, the improvement of reducing the nitrogen in said cycle oil which comprises mixing therewith a substantial amount of hydrocracked bottoms separated from catalytically hydrocracked products and in a weight ratio of hydrocracked bottoms to catalytic cycle oil feed between about 1/5 and 5/1, passing the resulting mixture to a contacting zone containing a hydrogenation-dehydrogenation catalyst under a pressure between about 500 and 2000 p.s.i.g. and a temperature between about 700 and 900° F. without adding extraneous hydrogen to said contacting zone and separating a treated light catalytic cycle oil containing less than 10 p.p.m. nitrogen.

7. A process according to claim 6 wherein a portion of the hydrocracked bottoms separated from hydrocracked products, is mixed with an aromatic hydrocarbon-containing fraction boiling above about 400° F. and the mixture passed to a hydrogen exchange zone containing a hydrogenation catalyst to produce an aromatic hydrocarbon gasoline and aromatic hydrocarbon bottoms fraction which is used as feed to a hydrocracking zone.

8. A process for hydrocracking cycle oils separated from catalytically cracked products containing more than about 10 p.p.m. nitrogen which comprises first mixing a substantial amount of hydrocracked bottoms obtained as hereinafter set forth with a catalytic cycle oil and in a weight ratio of hydrocracked bottoms to catalytic cycle oil feed between about 1/5 and 5/1, passing the resulting mixture to purifying zone containing a hydrogenation-rehydrogenation catalyst and under superatmospheric pressure and at an elevated temperature, separating a purified cycle oil containing less than about 10 p.p.m. nitrogen from the purified products leaving said purification zone, passing said purified cycle oil with added hydrogen through a hydrocracking zone containing a hydrocracking catalyst and maintained under superatmospheric pressure and an elevated temperature to produce converted hydrocracked products, fractionating said hydrocracked products to separate naphtha from hydrocracked bottoms and recycling said hydrocracked bottoms to said purification zone for admixture with cycle oil passing to said purification zone as above set forth.

9. A process according to claim 8 wherein a portion of said hydrocracked bottoms is mixed with an aromatic hydrocarbon-containing fraction which boils above about 400° F. and the mixture is passed to a catalytic hydrogen exchange zone to produce an aromatic hydrocarbon gasoline and aromatic hydrocarbon bottoms fraction which is recycled to said hydrocracking zone.

References Cited by the Examiner
UNITED STATES PATENTS

| | | | |
|---|---|---|---|
| 2,606,141 | 8/1952 | Meyer | 208—214 |
| 2,834,717 | 5/1958 | Shiah | 208—214 |
| 3,008,897 | 11/1961 | Burk et al. | 208—214 |
| 3,023,158 | 2/1962 | Watkins | 208—254 |
| 3,147,206 | 9/1964 | Tulleners | 208—58 |

PAUL M. COUGHLAN, *Primary Examiner.*

ALPHONSO D. SULLIVAN, *Examiner.*